UNITED STATES PATENT OFFICE.

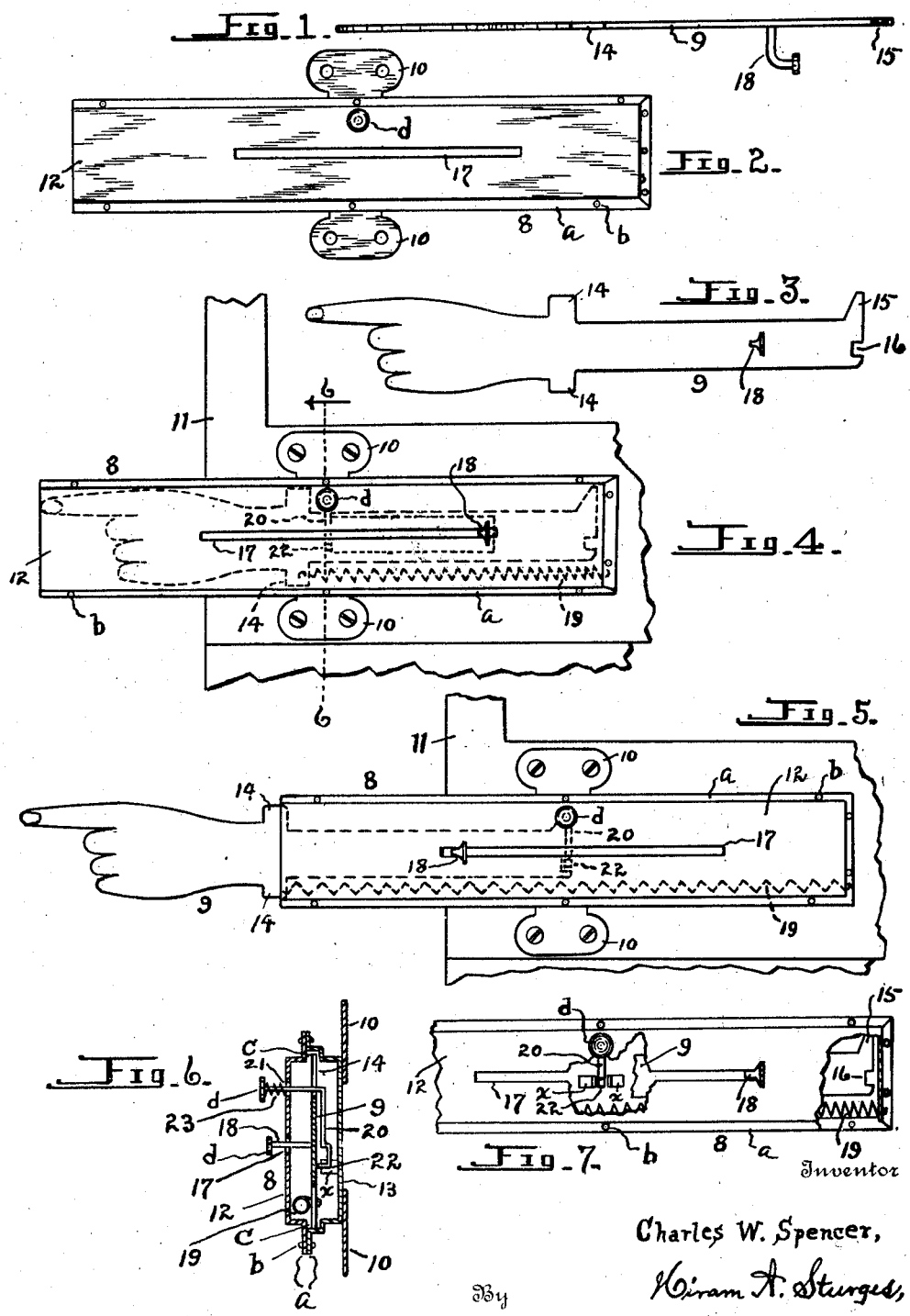

CHARLES W. SPENCER, OF OMAHA, NEBRASKA.

DIRECTION-INDICATOR FOR VEHICLES.

1,362,752.   Specification of Letters Patent.   Patented Dec. 21, 1920.

Application filed June 21, 1919. Serial No. 305,931.

*To all whom it may concern:*

Be it known that I, CHARLES W. SPENCER, a citizen of the United States, residing at Omaha, in the county of Douglas and State of Nebraska, have invented certain new and useful Improvements in Direction-Indicators for Vehicles, of which the following is a specification.

This invention relates to a direction indicator for vehicles, and more particularly for automobiles, and has for its object to provide signaling arms which may be attached to and may be moved outwardly of the sides of a vehicle to indicate the intention of the driver whether the vehicle is to be driven to the "right" or "left" when moving upon curves at street intersections or elsewhere, said indicators to consist of few and simple parts so that they may be economically manufactured and will be convenient and durable in use.

The invention consists of the novel construction, combination and arrangement of parts as described herein and claimed and as illustrated in the accompanying drawing, wherein,—

Figure 1 is a plan view of a signal arm. Fig. 2 is a side view of a casing for a signal arm. Fig. 3 is a side view of the signal arm. Fig. 4 is a partly broken side view, showing a casing applied to a part of a windshield, the signal arm being indicated by broken lines. Fig. 5 is a similar view to that shown in Fig. 4, the signal arm being extended. Fig. 6 is a transverse section through the casing on line 6—6 of Fig. 4. Fig. 7 is a broken away detail relating to Fig. 4 to clearly show a pair of guides for the releasing-arm.

Referring now to the drawing, numeral 8 indicates a rectilinear casing which may have any suitable length and width for containing a signal arm 9. The casings may be applied to any suitable parts of an automobile so that the signals may be moved outwardly, transversely of the line of travel, for indicating the intended movement for the vehicle, the bracket-plates 10, in the present instance, being shown secured to a part of the wind shield 11 and maintaining the casing in a horizontal position.

While I do not wish to limit myself to minor details, the casing preferably consists of a pair of rectangular metallic strips 12 and 13, both being bent to an angular form in cross-section, and provided at their longitudinal edges with flanges $a$ which may be connected by any suitable means, rivets $b$ being shown for this purpose; one of the ends of the casing thus provided being open, and its opposite end being closed, the transverse bending of the strips 12 and 13 being such that a pair of grooves $c$ will be formed longitudinally of the casing.

The signal arm is provided intermediate its ends to project outwardly of its edges with a pair of opposed projections 14, and its inner end is provided with a stop-lug 15, and a recess 16 is formed opening upon its inner end. The strip 12 of the casing is provided intermediate its ends, with a slot 17, and numeral 18 indicates a finger-piece or handle which projects outwardly of one of the sides of the signal arm.

The signal arm is adapted to be disposed within the casing with its finger-piece 18 engaging in the slot 17. Numeral 19 indicates a coiled spring disposed within and having one of its ends connected with the inner end of the casing, its opposite end being connected with a guide 14, and the signal arm is adapted to have slidable movements longitudinally of the casing, its projections 14 moving in the grooves or guides $c$ and its finger-piece 18 moving in the slot 17.

Numeral 20 indicates a latch or locking-bar substantially of L-shape, best shown in Fig. 6. It has a horizontal part adapted to be disposed in an aperture 21 formed in the strip 12, to project outwardly of said strip, its outer terminal being provided with a head-piece or push-button $d$, the vertical part of said latch or bar 20 being disposed between the signal arm and the plate 13 of the casing and provided with a hook or finger 22 at its inner terminal. By means of a spring 23 the button $d$ of said latch 20 is pressed outwardly of the strip 12 to cause the finger 22 to normally be pressed against the side of the signal arm.

A driver of a vehicle by use of the finger piece 18 may cause the signal arm to slide outwardly of the casing, against the force of the spring 19, the result being that the finger 22 of the latch will engage in the recess 16 of the signal arm to maintain said arm in its extended position, and by pressing the button $d$ inwardly the finger 22 will move out of the recess 16 and the signal arm will then slide inwardly of the casing by operation of the spring 19.

In order that a swinging movement of the L-shaped locking-bar may be prevented, the strip 13 is provided with a pair of opposed detent plates $x$ which project inwardly of the casing toward the signal arm, and shown in Figs. 6 and 7. The vertical part of the bar 20 is disposed between these plates.

As described, the bar 20 may be moved horizontally for engagement or disengagement with the signal-arm and for engaging in the recess 16, and a swinging movement of said bar longitudinally of the casing which otherwise would be caused by its engagement with the slidable movements of the signal arm when in engagement therewith will be prevented.

Among some of the advantages relating to construction, it may be stated that the parts are few and may be conveniently manufactured and are arranged for convenient operation. The projections 14 which engage in the grooves $c$ prevent any swinging movement of the signal arm in the casing so that it may be moved in one direction manually without appreciable friction, and may be readily moved by the spring, without binding, in an opposite direction.

The projection 15 operates as a stop when the signal is moved outwardly, since it will engage the horizontal part of the locking-bar 20.

The operation of the finger-piece 18 which is disposed in the slot 17 will tend to maintain the signal arm in line with the elongated casing. However, since the slot should be of ample width so that there will be no friction of the finger-piece 18 with the walls of the slot, the recess 16 will discharge the function of maintaining the longitudinal axes of the signal arm and casing parallel while the arm remains extended, action of the wind or vibration, often causing stresses to be directed to the arm when thus extended.

What I claim as my invention is,—

In a direction indicator for vehicles, a casing open at one of its ends, said casing being provided on its inner side with a pair of detent plates, its opposite side having a slot formed therein, a latch approximately of L-shape having a part provided with a head-piece and projecting through the side of the casing and having a part disposed between the detent plates and provided with a finger, a signal arm disposed within the casing, said arm having a recess opening on one of its ends and having a finger-piece engaging in the slot of the casing for moving it to extended position, resilient means tending to prevent a movement of said arm, and a spring between the head-piece of the latch and casing for pressing the finger of the latch into the recess of the signal arm when the latter has been moved to an extended position.

In testimony whereof, I have affixed my signature in presence of two witnesses.

CHARLES W. SPENCER.

Witnesses:
   HIRAM A. STURGES,
   ARTHUR H. STURGES.